(12) United States Patent
Fisk

(10) Patent No.: US 7,246,948 B2
(45) Date of Patent: Jul. 24, 2007

(54) BEARING ASSEMBLY

(75) Inventor: Richard William Fisk, Nottingham (GB)

(73) Assignee: NSK Europe Ltd., Berkshire (GB)

( * ) Notice: Subject to any disclaimer, the term of this patent is extended or adjusted under 35 U.S.C. 154(b) by 0 days.

(21) Appl. No.: 11/367,215

(22) Filed: Mar. 2, 2006

(65) Prior Publication Data

US 2006/0210209 A1 Sep. 21, 2006

(51) Int. Cl.
*F16C 35/06* (2006.01)
(52) U.S. Cl. .................... 384/537; 384/542
(58) Field of Classification Search .......... 384/542, 384/903, 537
See application file for complete search history.

(56) References Cited

U.S. PATENT DOCUMENTS

| 1,392,432 | A | * | 10/1921 | Miles | ............... | 384/542 |
| 1,675,910 | A | | 7/1928 | Riker | | |
| 2,277,635 | A | | 3/1942 | Delaval-Crow | | |
| 2,368,549 | A | * | 1/1945 | Kendall | ............... | 384/537 |
| 5,168,740 | A | | 12/1992 | Griesemer | | |

FOREIGN PATENT DOCUMENTS

| DE | 639295 | 6/1979 |
| DE | 19957709 | 11/1999 |
| DE | 20019278 | 11/2000 |
| DE | 10137296 | 8/2001 |
| DE | 10153441 | 10/2001 |

* cited by examiner

*Primary Examiner*—Thomas R. Hannon
(74) *Attorney, Agent, or Firm*—Gauthier & Connors, LLP

(57) ABSTRACT

A bearing assembly is disclosed which addresses the problem of axially retaining a bearing journaled onto a shaft within a casing in an axially compact and technically economic and reliable way by first mounting a retaining plate (6) onto an outer race of the bearing (1). The mounting can be achieved by press fitting onto a shoulder so that the retaining plate can rotate relative to the outer race. The bearing is then journaled onto a shaft (4) and inserted into a compact casing (3) so that the outer race is guided into a housing (2) formed in an end wall of the casing (3). The retaining plate can then be rotated as required to align fastening bosses (7) with holes (8) to be engaged by screws (9) so that the retaining plate us urged axially against the outer race.

8 Claims, 3 Drawing Sheets

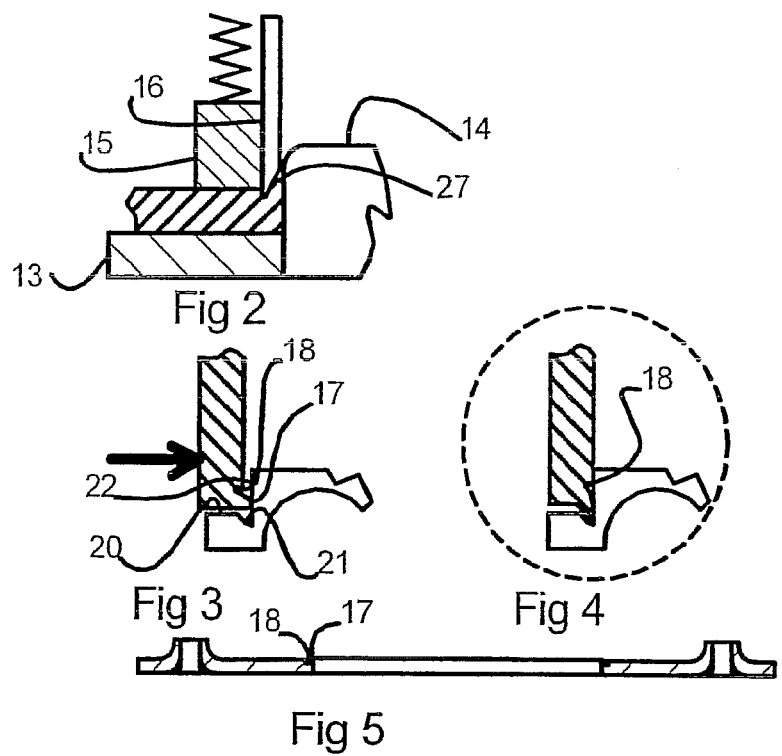
Fig 2
Fig 3
Fig 4
Fig 5
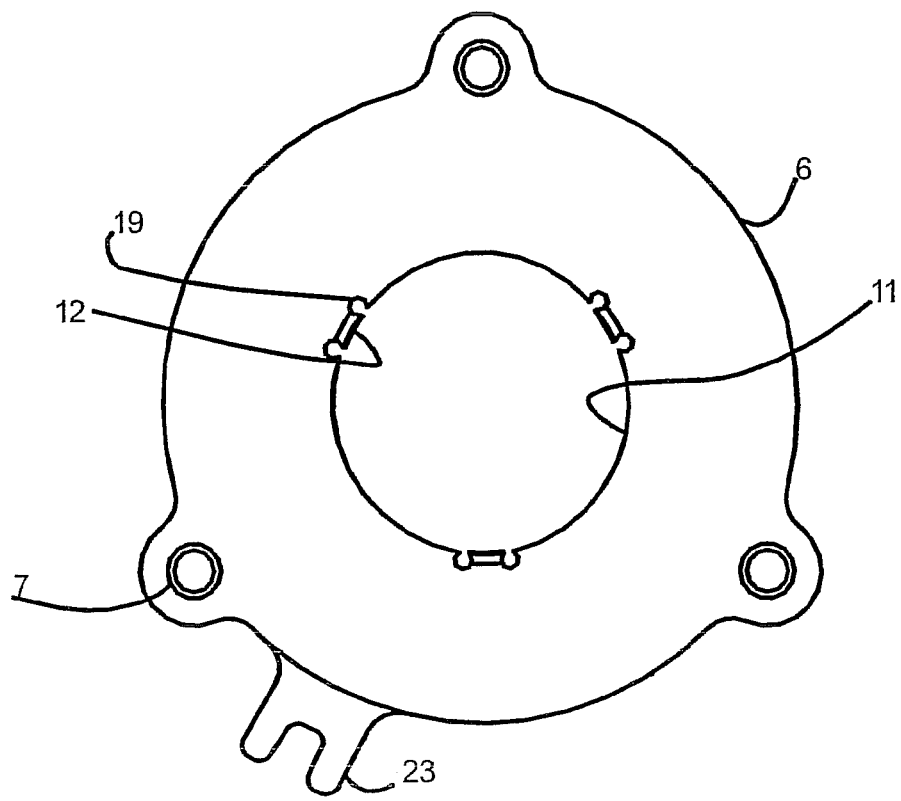
Fig 6

BEARING ASSEMBLY

PRIORITY INFORMATION

This application claims the benefit of International Patent Application Serial No. PCT/GB2004/003778 filed on Sep. 3, 2004 and claims priority to Great Britain Application Serial No. 0320650.5, filed on Sep. 3, 2003.

BACKGROUND OF THE INVENTION

The present invention is concerned with the form of and a method of forming a bearing assembly particularly adapted for use where the bearing is subject to axial loads, in very compact machine assemblies without fastening tool access to the bearing housing and where robot machine assembly is desirable.

The present invention arose in addressing the problem of assembling a bearing into a compact vehicular gear box housing where the bearing is journaled onto a gear shaft of the gear box together with a number of other components such as gears. It will hereafter be described in that context but unless otherwise stated the invention may have applications in many other similar structures. In such a gear box the gear shaft is journaled onto a bearing and the bearing received into a bearing housing formed in the gear box casing. The fitting of the outer is typically an engineering interference fit or similar means of location such that the outer is not free to take up a different angular orientation. In operation the shaft is subject to axial forces which urge the bearing out of its housing in each axial direction. The forces directed axially out of the casing are resisted by a shoulder formed in the casing. However a retaining means must act between the outer race of the bearing and the casing to prevent axial displacement in the opposite direction. An example of conventional means may be a circlip received into a groove formed in the wall of the bearing housing. However, the installation of such retaining means requires access by a tool to the inside of the casing and is difficult to implement robotically. Further the use of circlips and like devices requires a loose fit between the bearing outer and the circlip which undesirably permits axial movement of the bearing and occupies space in the axial direction. Also, circlips and similar devices are not easy to disassemble without good tool access. If such access requirement can be obviated robot assembly will be possible and the bulk of the gear box can be reduced with numerous advantages which will be apparent to the skilled person.

Also known in the prior art is EP1265339 which discloses a bearing assembly in a motor. A retaining plate is first mounted temporarily onto a shaft. A bearing is then journaled onto the shaft. The assembled retaining plate and bearing are then inserted into the motor casing with the outer race of the bearing being inserted into a bearing housing. This presents a problem in that the retaining plate must be dismounted from the shaft before operation. Further the retaining plate cannot be arranged to sit flush with the inner end of the bearing so that the axial length of the bearing and housing assembly is not minimised.

SUMMARY OF THE INVENTION

Accordingly to alleviate these problems the present invention provides a bearing assembly comprising:

a bearing assembly comprising: a bearing having an outer race for reception in a bearing housing formed in a casing and an inner race to be journaled onto a shaft, and a retaining plate mounted onto the outer race before assembly into the bearing housing or onto the shaft and provided with fastening means to cooperate with fastening means provided in or on a wall of the casing opposing the retaining plate.

The retaining plate may be irrotatably fastened for some applications, for example by press fitting. However, in the preferred embodiment of the invention the retaining plate is fastened so as to rotate with respect to the outer race thus providing for convenient alignment of the fastening means after the outer race is irrotatably retained in the housing.

Further according to the present invention there is provided a method of forming a bearing assembly comprising the steps of:

mounting a retaining plate on an outer race of a bearing whereby when the bearing is seated in a bearing housing it is axially retained by the retaining plate which is secured by fastening means acting between a casing in which the bearing housing is formed and the retaining plate.

According to another aspect of the present invention there is provided a method of forming a boss in a plate to be subject to cyclic fatigue loads in use comprising, selecting the material of the plate to have a high strain hardening coefficient in excess of 0.35, and press forming the boss against a die such that the radius of curvature of the region between the original plate and the wall of the boss complies with the formula:

radius=plate thickness×$A$ where "$A$" has a value between 0.3 and 0.7 such that the arcuate portion of the boss work hardens under load to produce a region having a high local tensile strength.

BRIEF DESCRIPTION OF THE DRAWINGS

The bearing assembly of the present invention alleviates the problems discussed above as will be apparent from the following non limiting detailed description of one embodiment of the bearing assembly and method of forming a bearing assembly which refers to the figures described briefly as follows:

FIG. 2 is an enlarged sectional elevation through a die punch showing the formation of a clinching lip (17) on a retaining plate of the assembly, FIG. 3 is an enlarged sectional view through a shoulder of a bearing as the retaining plate is mounted on it, FIG. 4 is an enlarged sectional view showing the engagement of the clinching lip (17) with the groove in the retaining plate, FIG. 5 is a sectional view through the retaining plate alone and, FIG. 6 is a plan view of the retaining plate.

DESCRIPTION OF THE INVENTION

Figure 1:
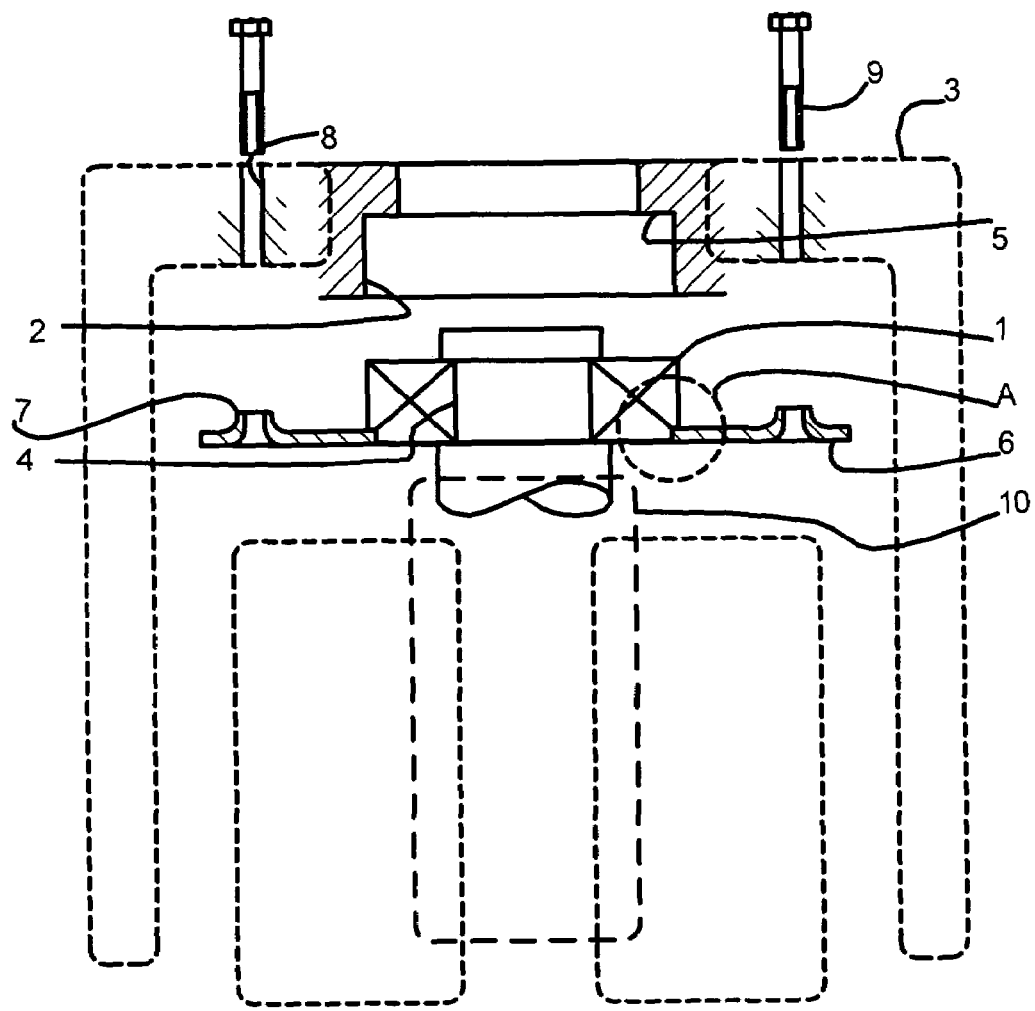
FIG. 1 is a sectional elevation through a gear box casing showing the bearing assembly during installation in a bearing housing formed in the casing.

Referring to the drawings, FIG. 1 shows a bearing assembly comprising, a bearing 1 having an outer race for reception in a bearing housing 2 formed in a casing 3 for a vehicular gear box. The inner race of the bearing 1 is journaled onto a shaft 4. The bearing 1 is to be received into the bearing housing 2 so that it abuts a shoulder 5 formed in the housing to prevent displacement of the bearing in the axial direction (with respect to the shaft) out of the casing 3.

To prevent the bearing 1 being displaced in the opposite axial direction a retaining plate 6 is mounted for rotation with respect to the outer race of the bearing 1. When the bearing 1 is seated in the housing fastening means provided by threaded bosses 7, formed in the retaining plate 6, are aligned with through holes 8 formed through the casing 3 so that screws 9 can be driven through the holes to engage in the bosses 7 and retain the retaining plate 6. The bearing assembly can therefore be installed where the components 10 are mounted on the shaft in such close proximity to the retaining plate as to prevent the operation of the tools between the retaining plate and the components and where the casing surrounds the bearing shaft, components and retaining plate to the extent that a fastening tool cannot operate on the retaining plate. This in turn allows further components such as gears 10 to be assembled on to the shaft in very close proximity to the bearing 1 before the bearing assembly and shaft is installed.

The retaining plate 6 is formed from metal strip by first punching out the bosses 7. A centre hole 11 is then punched out. A plurality of clinching lip 17s 12 are then formed along arcs spaced around the circular inside edge of the retaining plate 6. In the present example three lip 17s are formed, however, according to specific requirements two to five lip 17s may be formed.

FIG. 2 shows the use of a specially designed punch tool to form the clinching lip 17. The hole 11 is located on a die plate 13 surrounding a circular guide 14. A platen ring 15 is then pressed against the exposed surface of the plate before a coining punch 16 is driven part way into the surface of the retaining plate spaced a small distance from the edge of the hole. The coining punch has a wedge shaped blade 27 which engages in the surface of the retaining plate to plastically deform the edge of the plate so forming a lip 17 on the edge which projects up, i.e. in the axial direction, from the surface of the retaining plate and leaves a groove 18 along its edge remote from the hole. The coining punch may also form notches 19 at each end of the arc to control the deformation at each end. Each arc deformed by the coining punch extends over between 12 and 36 degrees of arc so that the total part of the edge deformed is between 10% and 30%.

A shoulder 20 is formed on the edge of the outer bearing race of the bearing 1. A triangular shaped groove 21 is formed in the shoulder 20 adjacent the axial face 22 formed with the shoulder. In the present example the groove is of the order of 0.3-0.4 mm deep and the clinching lip 17 is of a similar height. The hole in the retaining plate is made oversize in relation to the diameter of the shoulder 21.

To secure the retaining plate 6 to the bearing 1 the retaining plate is located over the bearing with the clinching lip 17 engaging the axial face 22. It may be noted that the fit of the hole 11 over the shoulder 20 is loose as indicated by the exaggerated gap shown in FIGS. 3 and 4. An assembly force is then applied in the direction of the arrow in FIG. 3 which plastically deforms the clinching lip 17 causing it to engage in the groove 21 as shown in FIG. 4.

The retaining plate 6 also provides a retaining element in the form of a "U" shaped bracket 23 projecting from an outer periphery of the plate. The Forks of the "U" shape d plate engage a gear change support rod (not shown).

It is undesirable that the plate gauge should be any greater than necessary in order to minimise the space occupied by the retaining plate. It is essential that the bearing is retained with minimal movement so that the fastening means need to provide the retaining plate with a clamping action against the axial face of the bearing. It is furthermore the case that the retaining plate is subject to cyclic axial loads during operation which present a metal fatigue problem. Conventionally punch forming the bosses onto the plate exacerbates the metal fatigue problem by work hardening the plate so that punch forming the bosses is contraindicated. However, punch forming presents substantial economies by comparison with alternative conventional solutions to the formation of fastening means. It is a further problem with punch forming the bosses to ensure that the end faces of the bosses are exactly flat.

In order to enable punch forming of the bosses the plate may conveniently be formed from a material having a high strain hardening coefficient. Preferred examples are austenitic stainless steel grade 304 and plain carbon steel grades 1020-1040. An alternative approach is to select a highly formable material and after formation of the bosses to subject it to further processes such as surface hardening or the Nitrotec process to improve its fatigue tolerance.

Figure 7A:
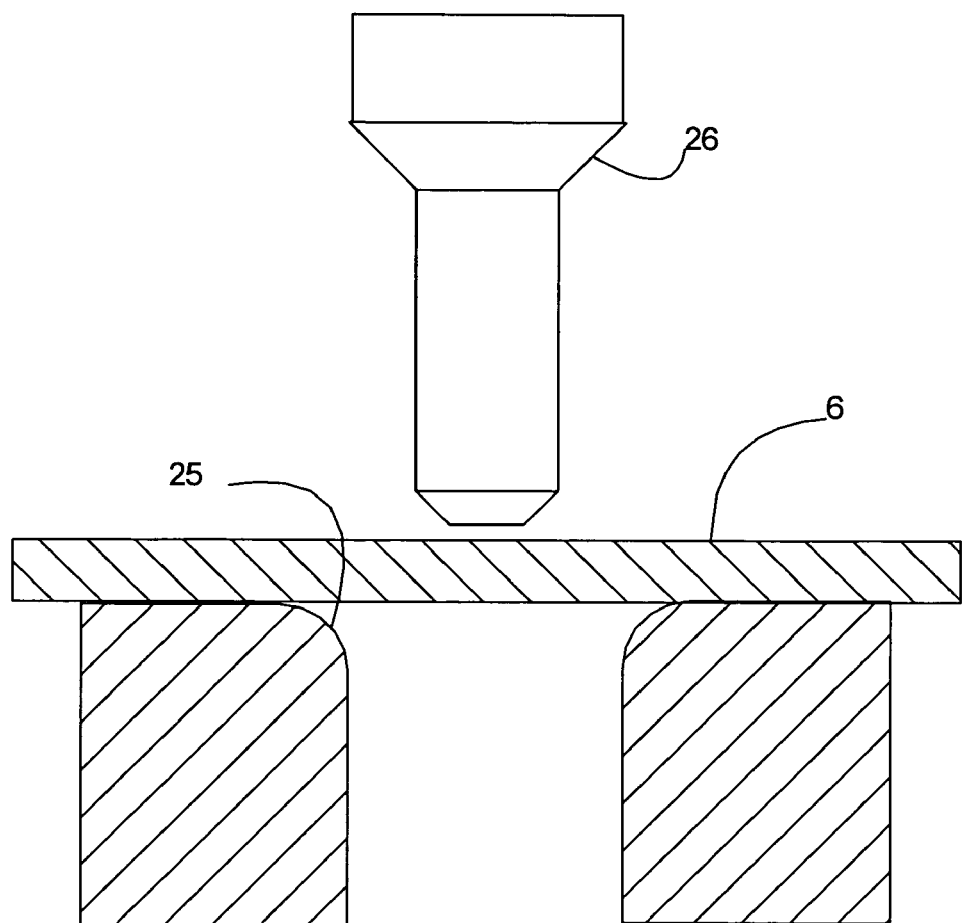
FIGS. 7A and 7B show the formation of a boss in the retaining plate.
Figure 7B:
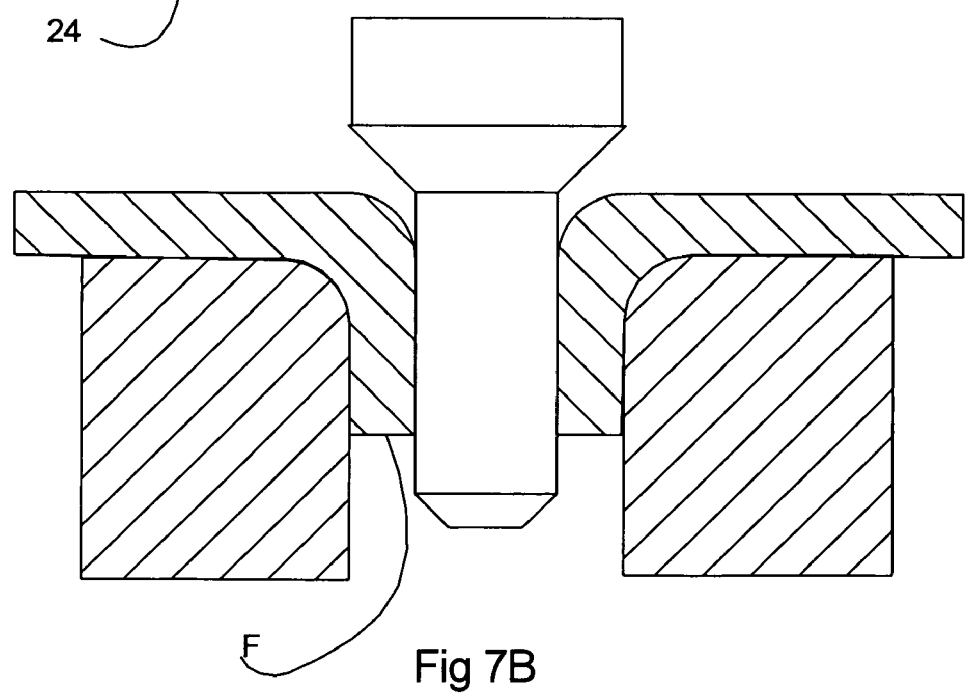

FIGS. 7A and 7B illustrates the tooling designed for formation of the bosses. The tooling comprises a die 24 having an arcuate rim 25. The radius of the arc must be carefully formed to prevent necking in the restraining plate 6. The radius of the arc is preferably formed in compliance with the formula:

$$\text{radius} = \text{plate thickness} \times A$$

where "A" has a value between 0.3 and 0.7.

A punch tool 26 is specially shaped to ensure that in cooperation with the die the end face "F" of the boss 7 is flat and square.

Although the example described uses screws to fasten the plate the use of other fastening means such as rivets is envisaged as within the scope of the invention.

The invention claimed is:

1. A bearing assembly comprising:
   a bearing having an outer race for reception in a bearing housing formed in a casing and an inner race to be journaled onto a shaft, wherein
   a retaining plate is mounted onto the outer race before assembly into the bearing housing and provided with fastening means to cooperate with fastening means provided in or on a wall of the casing opposing the retaining plate, the retaining plate is mounted by means of a press action loose fitting clinching lip formed on a circular inside edge of the retaining plate which deforms plastically to engage in a circular groove formed in a circular shoulder in the outer race of the bearing.

2. An assembly according to claim 1 wherein the retaining plate is mounted for relative rotation with respect to the outer race.

3. An assembly according to claim 1, wherein the clinching lip is formed only on spaced parts of the circular inside edge of the retaining plate.

4. An assembly according to claim 1, wherein the total circumferential length of the spaced parts is between 10% and 30% of the circumference of the inside edge.

5. An assembly according to claim 1 wherein the fastening means comprises a screw received into a boss in the retaining plate via a through hole formed in the casing.

6. An assembly according to claim 1, wherein the fastening means act together to angularly align the retaining plate to a predetermined orientation.

7. An assembly according to claim 1 wherein the retaining plate includes further locating or retaining elements to locate or retain other components of the assembly.

8. An assembly according to claim 1 in combination with a gear box.

\* \* \* \* \*